(12) United States Patent
Sun et al.

(10) Patent No.: US 10,635,733 B2
(45) Date of Patent: Apr. 28, 2020

(54) PERSONALIZED USER-CATEGORIZED RECOMMENDATIONS

(71) Applicant: Microsoft Technology Licensing, LLC, Redmond, WA (US)

(72) Inventors: Yanfeng Sun, Redmond, WA (US); Alexandre Bernard Raymond Michelis, Bellevue, WA (US); Arun Kumar Sacheti, Sammamish, WA (US); Emily Lin, Seattle, WA (US); Ryuichi Hirano, Renton, WA (US); Vincent Kin-Wah Leung, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 311 days.

(21) Appl. No.: 15/627,963

(22) Filed: Jun. 20, 2017

(65) Prior Publication Data
US 2018/0322206 A1 Nov. 8, 2018

Related U.S. Application Data

(60) Provisional application No. 62/502,038, filed on May 5, 2017.

(51) Int. Cl.
*G06F 16/9535* (2019.01)
*G06F 16/901* (2019.01)
*G06F 16/9038* (2019.01)

(52) U.S. Cl.
CPC ...... *G06F 16/9535* (2019.01); *G06F 16/9024* (2019.01); *G06F 16/9038* (2019.01)

(58) Field of Classification Search
CPC .................................................. G06F 16/9535
USPC ............................................................ 707/732
See application file for complete search history.

(56) References Cited

U.S. PATENT DOCUMENTS

| 7,827,208 | B2 | 11/2010 | Bosworth et al. | |
| 8,060,830 | B2 | 11/2011 | Kahn et al. | |
| 8,122,031 | B1 | 2/2012 | Mauro et al. | |
| 8,996,530 | B2 | 3/2015 | LuVogt et al. | |
| 2002/0055868 | A1* | 5/2002 | Dusevic | G06F 16/954 705/7.13 |
| 2004/0254957 | A1* | 12/2004 | Hyotyniemi | G06F 16/636 |

(Continued)

FOREIGN PATENT DOCUMENTS

| WO | 2008113425 A1 | 9/2008 |
| WO | 2016020465 A1 | 2/2016 |

OTHER PUBLICATIONS

"Bing Image Feed", https://www.bing.com/images/discover?FORM=ILPMFT, Retrieved on: Apr. 27, 2017, 2 pages.

(Continued)

*Primary Examiner* — Kimberly L Wilson
(74) *Attorney, Agent, or Firm* — Merchant & Gould

(57) ABSTRACT

Methods and systems for providing targeted recommendations are provided. A user model is generated from user data. Feed candidates are generated based on the user model. The generated feed candidates are ranked on a predetermined scale. At least one targeted recommendation from the ranked feed candidates. The at least one targeted recommendation feed is provided to a user associated with the user data.

20 Claims, 9 Drawing Sheets

(56) References Cited

U.S. PATENT DOCUMENTS

| | | |
|---|---|---|
| 2007/0078857 A1 | 4/2007 | Punaganti et al. |
| 2009/0006974 A1 | 1/2009 | Harinarayan et al. |
| 2013/0254290 A1 | 9/2013 | Grossman |
| 2014/0365507 A1 | 12/2014 | Wissner et al. |
| 2015/0100509 A1* | 4/2015 | Pappas .................. G06Q 50/01 705/319 |
| 2015/0112918 A1 | 4/2015 | Zheng et al. |
| 2015/0262069 A1 | 9/2015 | Gabriel et al. |
| 2017/0131864 A1* | 5/2017 | Edgar .................. G06F 3/0485 |

OTHER PUBLICATIONS

"Best 25+ Ideas about Appetizers", https://www.bing.com/discover/appetizers, Retrieved on: Apr. 27, 2017, 4 pages.

"International Search Report & Written Opinion for PCT Patent Application No. PCT/US18/028227", dated Jul. 2, 2018, 11 Pages.

* cited by examiner

MOBILE COMPUTING DEVICE

PERSONALIZED USER-CATEGORIZED RECOMMENDATIONS

CROSS REFERENCE TO RELATED APPLICATIONS

This application claims the benefit of U.S. Provisional Patent Application Ser. No. 62/502,038, having the title of "PERSONALIZED USER-CATEGORIZED RECOMMENDATIONS" and the filing date of May 5, 2017, which is hereby incorporated by reference in its entirety herein.

BACKGROUND

With increasing usage of mobile devices, system-generated feeds of recommended content are becoming a more central way to browse or discover application or webpage content. However, current solutions that generate such recommendation feeds do not provide a good way for users to organize the content. For example, current systems have a single recommendation feed where content from all topic categories a user has expressed interest in the past are grouped together. While these single recommendations provide a good way to view all the content, it is very limiting if the user desires to focus on a particular category.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to systems, methods, and computer readable storage devices for providing targeted recommendations. For example, a user model is generated from user data. A plurality of user groups are generated based on the user data received from a plurality of users. A topic-specific user model is generated based on content related to a particular topic. A non-personalized feed is then generated. Next, personalized topic candidates are generated from the non-personalized topic feed. The generated topic feed candidates are ranked on a predetermined scale. One or more topic feeds are selected from the topic feed candidates based on the ranking. The selected topic feeds are presented to a user.

Examples are implemented as a computer process, a computing system, or as an article of manufacture such as a device, computer program product, or computer readable medium. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
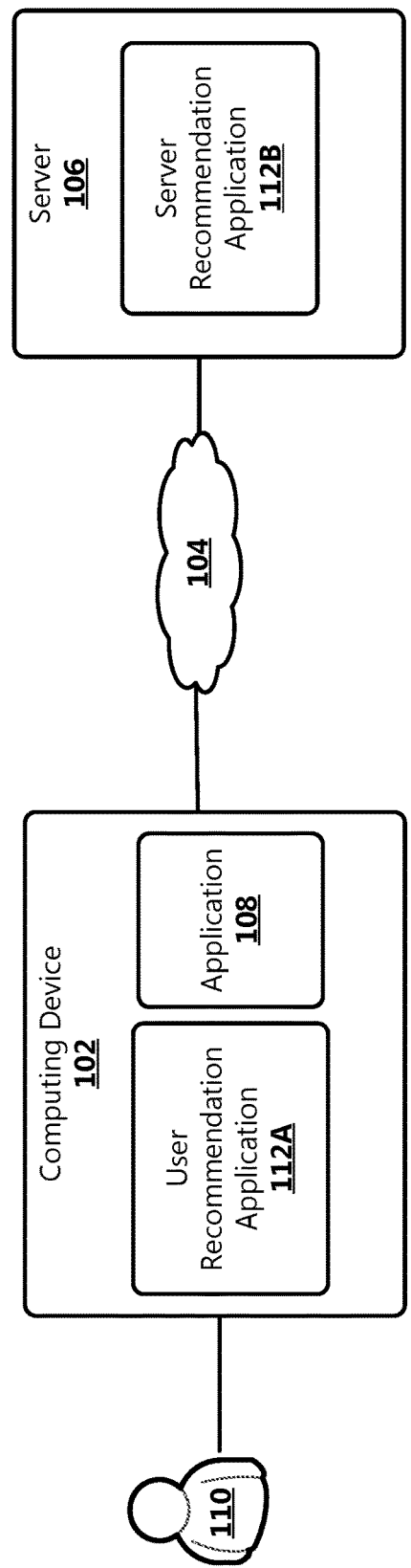
FIG. 1 is a block diagram showing an example operating environment including components of a system for providing targeted recommendations.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to systems, methods, and computer readable storage devices for providing targeted recommendations to one or more users. For example, aspects of the disclosure enable a user to create multiple categories of feeds/topics through which a recommendation system generates targeted recommendations. In example aspects, each of these user created categories have an independent lifecycle.

In one aspect, the disclosure provides a way for a user to create multiple buckets or categories of feeds/topics of interest. For example, these buckets can be created based on the user's needs or interests. Examples of such buckets may include "My Holiday Party 2017," "Summer Vacation Ideas with Kids," "Mother's Day ideas". For each of these categories, the user can provide signals to a recommendation system by either following some topics (e.g., "Summer Vacation Ideas with Kids"->{Hawaii, Making Sandcastles, Hiking in Hawaii}, "Mother's Day ideas"->{"French Breakfast recipes," "Living room decoration ideas"}) or by adding specific seed documents (e.g., images, videos, entities, or web pages) to each of the categories. The recommendation system then generates recommendations personalized to user-provided signals and specific to the category, as well as, a top level recommendation stream/feed that aggregates content from all the categories. Thus, the recommendation system disclosed herein enables the user to view the recommendations for a specific task/category at a given point in time rather than getting everything bundled in one recommendation stream.

In some aspects, the recommendation system disclosed herein provides a personalized topic feed to the user when the user follows a topic. For example, the recommendation system provides the personalized feed based on the user's interest to help the user concentrate on a particular interest. In some aspects, the recommendation system automatically maps the user's interest to one or more predefined high level categories enabling the user to easily drill down into one or more particular areas. Some examples of high level categories include (but are not limited to) travel, fashion, recipes, etc. The difference from the recommendations provided based on user-created categories versus system-created categories is that the user does not have to follow a topic. In some aspects, the recommendation system disclosed herein allows the user to create and manage a task (for example, an interest group), and provides a feed based on the specific task. In some aspects, the user can un-follow a topic or delete the task so that the personalized feed will be removed. Advantageously, the recommendation system improves user efficiency by arranging recommended content in a manner that results in more efficient user interaction. Further, the user is enabled to view recommended content in an efficient user interface display, which minimizes a number of searches for desired content and thus reduce a network bandwidth usage.

In example aspects, a person with skill in the art will recognize that while the aspects of the disclosure are described using multimedia use cases with content related to a particular topic, recommended content is not limited to followed topics, saved images/videos/articles, disliked images/videos/articles, and or the like. Recommended content can be extended to other content types, as well as, incorporating any available user signals. The disclosed recommendation system provides an ability for the user to group signals to the recommendation system for generating recommendations under user-specified categories. In addition, the recommendation system generates recommendations specific to a category. Moreover, the recommendation system disclosed herein provides for building a main recommendation feed by aggregating content from a plurality of categories.

In some aspects, the recommendation system disclosed herein provides an ability to remove an entire category from a recommendation stream. For example, the recommendation system enables the user to remove a selected category with a single click or gesture. In another example, the recommendation system is operable to remove a selected category automatically. For example, an interest often has a timeline for the user, and once a related task is accomplished, the category related to that interest is automatically removed. After the removal of the category, the user no longer receives recommendations related to the removed category.

In an example aspect, the recommendation system is operable to dynamically and continuously detect the user's interest or lack thereof in a category or a topic. For example, the recommendation system starts to demote a category when no activity is detected for that interest/topic in that category for a predetermined period of time. In some aspects, after a predetermined number of demotions, the category may be removed from the recommendation stream.

With reference now to FIG. 1, a block diagram of an example operating environment 100 illustrating aspects of an example system for providing targeted recommendations is shown. Example operating environment 100 includes an electronic computing device 102. Computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications 108 for performing a variety of tasks. The hardware of these computing devices is discussed in greater detail in regard to FIGS. 6, 7A, 7B, and 8.

In one aspect, computing device 102 includes an application 108. A user 110 may utilize an application 108 on the computing device 102 for a variety of tasks, which may include, for example, accessing the Internet, accessing webpages, performing searches on webpages, and the like. Examples of suitable applications 108 include, but are not limited to, browser applications, multimedia applications, or one or more applications provided by a webpage. Applications 108 may include thick client applications 108, which are stored locally on computing device 102, or may include thin client applications 108 (i.e., web applications) that reside on a remote server and accessible over a network. A thin client application 108 may be hosted in a browser-controlled environment or coded in a browser-supported language and reliant on a common web browser to render application 108 executable on computing device 102. In one aspect, computing device 102 includes a user recommendation application 112A.

According to examples, application 108 is a program that is launched and manipulated by user 110. For example, user 110 can create one or more user profiles. A user profile, for example, includes content of interests, upcoming events, a topic of interest, and the like. In examples, application 108 receives input from the user, such as text input, drawing input, inking input, etc., via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence.

According to an aspect, application 108 is operative to communicate with a server 106 over a network 104. Network 104 may be any type of network capable of facilitating communications between computing device 102 and server 106. Examples of such networks include, but are not limited to, LANs, WANs, cellular networks, and/or the Internet. Server 106 includes one or more computing devices, such as the computing environment illustrated in FIG. 6. In some aspects, server 106 is a distributed server or a cloud server. Server 106 includes a server recommendation application 112B.

In one aspect, user recommendation application 112A and server recommendation application 112B are operative to provide targeted recommendations to user 110 on application 108. For example, user recommendation application 112A is operative to capture one or more interests associated with user 110 and send it as user data to server 106 or server recommendation application 112B. Server recommendation application 112B uses the user data to generate targeted recommendations. The generated targeted recommendations are then provided to user 110.

In one aspect, user recommendation application 112A and server recommendation application 112A in combination, unless stated otherwise, are referred to as recommendation application 112. In another aspect, application 108 is operable to capture and send the user interests to server 106.

Methods of providing targeted recommendations are described in greater detail in following parts of the disclosure. In some aspects, although recommendation application 112 is shown to reside on computing device 102 and server 106, it will be apparent to a person with ordinary skill in the art that recommendation application 112 can reside in its entirety either on server 106 or computing device 102.

Figure 2:
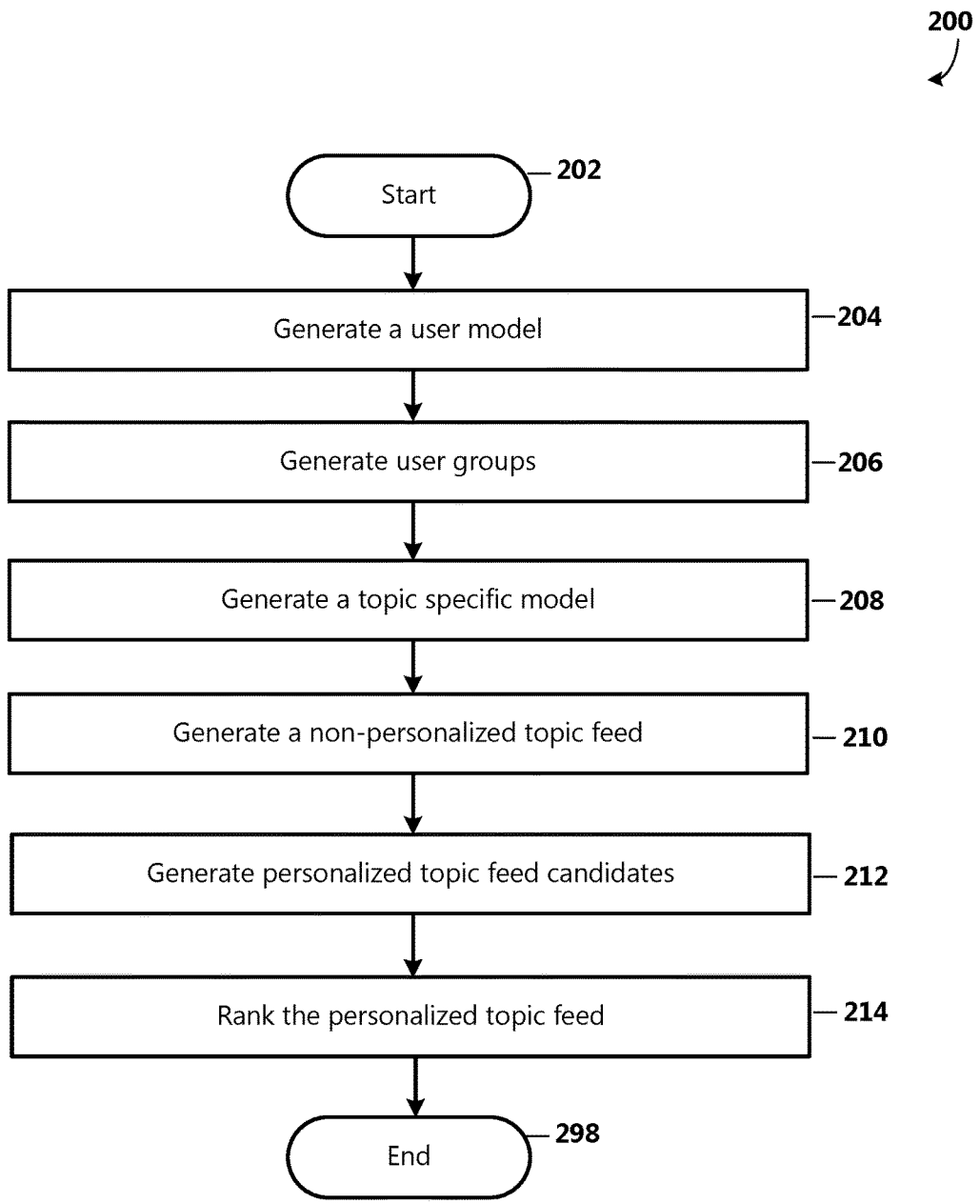
FIG. 2 is a flow chart showing general stages involved in an example method for providing a personalized topic feed.

Having described an operating environment with respect to FIG. 1, FIGS. 2, 3, and 4 are flow charts showing general stages involved in example methods for providing targeted recommendations. For example, FIG. 2 is a flow chart showing an example method 200 for providing a personalized topic feed to user 110. In one aspect, method 200 provides, when user 110 follows a topic, a personalized feed based on the user's 110 interests to help user 110 concentrate on a particular interest.

With reference now to FIG. 2, method 200 begins at start OPERATION 202, and proceeds to OPERATION 204, where a user model is generated. The user model is generated based on user data. For example, the user model may be generated based on user's 110 interests. The user's interests may include followed topics, saved images and videos, liked videos and images, and disliked images and videos. In one aspect, the user's interests are collected either by application 108 or by user recommendation application 112A. The collected user's interests are sent to server 106. Server recommendation application 112B then processes the received user's interests to generate the user model.

In one aspect, the user model includes one or more vectors. For example, server recommendation application 112B is operable to present user's interests as one or more user vectors. In one aspect, the user's interests are modeled as one user vector. In another aspect, the user's interests are modeled into more than one user vector. For example, the user's interests are modeled as one user vector per user interest. In yet another example, the user's interests are modeled as positive user vectors and negative user vectors. Positive user vectors are generated from positive signals in the user data and the negative user vectors are generated from negative signals in the user data. For example, the positive user vectors are generated based on a positive feedback from user 110 for a topic or a feed. Examples of positive feedback include, for example, a higher user rating or liking for an image or a feed. In one aspect, the negative user vectors are generated from a negative feedback from user 110 for a topic or a feed. Examples of negative feedback include a lower user rating or disliking an image or a feed.

In some aspects, there can be multiple user vectors flowing from a single topic of interest. For example, for a "Thanksgiving dinner" topic, the user vectors could include baking turkey, Christmas tree decoration, upcoming sales, etc. In some aspects, the user vectors are generated using clustering user recommendations into one or more groups. The clustered groups then are used to generate user vectors. User vector generation is described in greater detail in the following part of the specification. In some aspects, server recommendation application 112B is operative to generate the user vectors.

In one aspect, the user vectors are generated using content modeling. For example, the user data is mapped to text, and the text is then mapped to a semantic space. For example, the user data including an image of a turkey on a plate may be mapped to "Thanksgiving dinner", food, turkey, etc. One or more bigrams are generated from the corresponding text. The user vectors are then generated from the bigrams. In some aspects, one or more learning algorithms are used for mapping user data into the semantic space. For example, training sets, such as sparse matrices, are used to train a learning algorithm, and the trained learning algorithm is used for mapping. The mapping of the user data into semantic space is described in greater detail in the following part of the specification.

After generating a user model at OPERATION 204, method 200 proceeds to OPERATION 206, where user groups are generated. The user groups are generated based on the user data associated with plurality of users. For example, a plurality of users are categorized in a group if they have a common user interest in the user data. In another example, the user data are categorized into logical categories. These logical categories are then recognized as user groups. In some aspects, the user groups are generated based on the user data vectors. Server recommendation application 112B is operative to automatically extract user groups from the available user data and map user 110 to one or multiple groups.

After generating user groups at OPERATION 206, method 200 proceeds to OPERATION 208, where one or more topic-specific models are generated. A topic-specific model is generated based on content specifically related to a particular topic. For example, the topic-specific user model is generated based on followed topics, saved images and videos, disliked images and videos related to the particular topic. In another example, the topic specific model is generated based on topics common in the user data collected from a plurality of topics. The topic specific model may include a hierarchy of topics. In some aspects, the topic-specific models are represented as topic-specific vectors. For example, each topic-specific model is represented as one or more topic-specific vectors. In one aspect, server recommendation application 112B is operative to generate a topic-specific model.

After generating the topic-specific model at OPERATION 208, method 200 proceeds to OPERATION 210, where non-personalized topic feeds are generated. The non-personalized topic feeds are generated based on one or more user groups. In one aspect, server recommendation application 112B is operative to generate the non-personalized topic feeds. For example, server recommendation application 112B is operable to conduct a search to locate data associated with the topic specific models or user groups. Server recommendation application 112B is operable to conduct the search on data stored on server 106, one or more data storage devices associated with server 106, or the Internet.

After generating the non-personalized topic feeds at OPERATION 210, method 200 proceeds to OPERATION 212, where personalized topic feed candidates are generated. The personalized topic feed candidates are generated from the non-personalized topic feeds based on the user model. For example, the personalized topic feed candidates are generated by filtering the non-personalized feed based on the user vector. Server recommendation application 112B is operative to generate the personalized topic feed candidates from the non-personalized topic feeds.

After generating the personalized topic feed candidates at OPERATION 212, method 200 proceeds to OPERATION 214, where the personalized topic feed candidates are ranked. For example, the personalized topic feed candidates are ranked on a predetermined scale (such as, but not limited to, between 1 and 5). The ranking for the personalized topic feed candidates is determined based on a closeness of the feed candidates to the user vectors. In one aspect, server recommendation application 112B is operative to rank the personalized topic feed candidates. The ranking of the topic feed candidates is described in greater detail in the following parts of the disclosure.

In some aspects, the ranked personalized feed candidates are presented to user 110. For example, the personalized topic feed candidates may be displayed in application 108 in ascending or descending order of their rank. In one aspect, a number of the personalized topic feeds to be displayed in application 108 are predetermined and limited to a certain value. In such aspects, the personalized topic feed candidates may be filtered based on the determined ranking. For example, user 110 is enabled to provide the number of personalized topic feeds for each category.

In one aspect, user recommendation application 112A is operative to continuously collect a user response/feedback regarding the provided personalized topic feeds. For example, user recommendation application 112A is operative to collect feedback such as whether the provided personalized topic feeds were viewed or ignored by user 110. In addition, user recommendation application 112A is operative to collect feedback such as whether user 110 liked or disliked the provided personalized topic feeds. The collected feedback is sent to server recommendation application 112B as user data. Server recommendation application 112B is operable to use the collected feedback to improve the user model and/or the user vectors. After providing the personalized topic feeds, method 200 ends at OPERATION 298.

Figure 3:
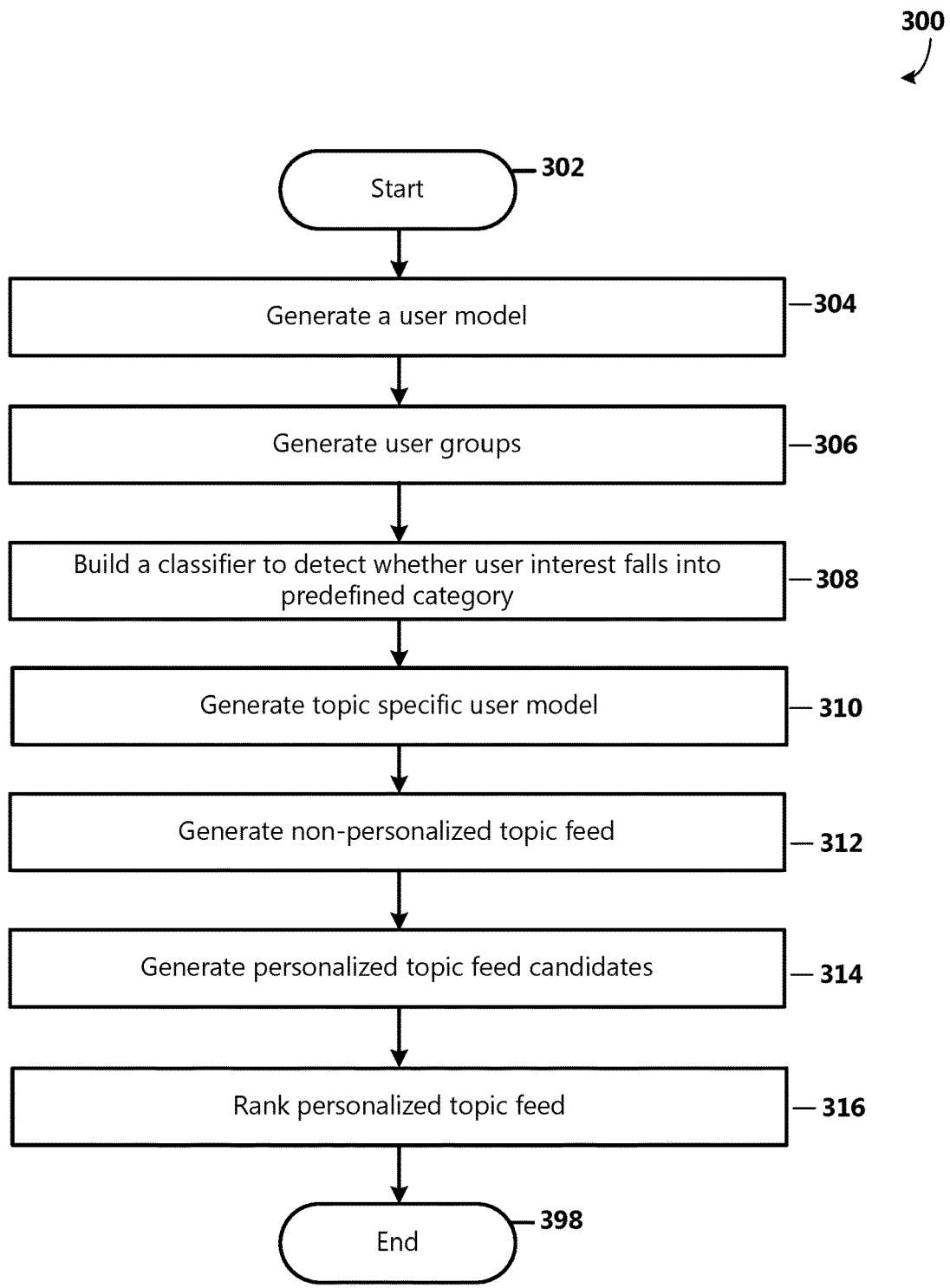
FIG. 3 is a flow chart showing general stages involved in another example method for providing a personalized topic feed.

FIG. 3 is a flow chart showing an example method 300 for providing a personalized topic feed to user 110 without user 110 having to follow a topic. In method 300, user's 110 interests are automatically mapped to one or more predefined categories. The predefined categories are high level categories such as travel, fashion, recipe, etc. Method 300 provides feeds for these high level categories to user 110. User 110 then can drill down into some particular topic from these high level categories.

With reference now to FIG. 3, method 300 begins at start OPERATION 302, and proceeds to OPERATION 304, where a user model is generated. As discussed previously, the user model is generated based on the user data. For example, the user model is generated based on followed topics, saved images and videos, disliked images and videos by user 110. In one aspect, the user model is presented as one or more user vectors. For example, the user data are modeled as one user vector or multiple user vectors. In some aspects, the user data are modeled as positive user vectors and negative user vectors.

After generating the user model at OPERATION 304, method 300 proceeds to OPERATION 306, where user groups are generated. The user groups are generated based on the user data. For example, one or more users with matching interests are grouped in a user group. All users interested in a particular topic/feed, for example, "Thanksgiving dinner", are grouped together. In one aspect, server recommendation application 112B is operative to automatically extract the user groups from the available user data and map user 110 to one or multiple groups.

After generating user groups at OPERATION 306, method 300 proceeds to OPERATION 308, where a classifier is built to detect whether the user's interest falls into a predefined category. The classifier is built to detect one or more user vectors from the user's interests, and compare the user vectors with one or more predefined categories. For example, if a user vector matches with a category vector, then user 110 is determined to be interested in the category represented by the category vector. In one aspect, server recommendation application 112B is operative to build the classifier.

After building the classifier at OPERATION 308, method 300 proceeds to OPERATION 310, where one or more topic-specific user models are generated. A topic-specific user model is based on content related to a particular topic. For example, the topic-specific user model is generated based on followed topics, saved images and videos, disliked images and videos related to the particular topic. In one aspect, server recommendation application 112B is operative to generate a topic-specific user model.

After generating the topic-specific user model at OPERATION 310, method 300 proceeds to OPERATION 312, where non-personalized topic feeds are generated. The non-personalized topic feeds are generated based on one or more user groups. For example, server recommendation application 112B is operable to conduct a search to locate data associated with the topic-specific user model. Server recommendation application 112B is operable to conduct the search on data stored on server 106, one or more data storage devices associated with server 106, or the Internet.

After generating the non-personalized topic feeds at OPERATION 312, method 300 proceeds to OPERATION 314, where personalized topic feeds are generated. The personalized topic feeds include user specific content filtered from the non-personalized topic feeds. The personalized topic feeds are generated based on the user model and the topic-specific user model. Server recommendation application 112B is operative to generate the personalized topic feeds. For example, server recommendation application 112B is operative to filter personalized topic feeds from the non-personalized topic feeds using the user vector of the user model.

After generating the personalized topic feeds at OPERATION 314, method 300 proceeds to OPERATION 316, where the personalized topic feeds are ranked. The ranking is determined based on a degree of similarity between the user vector and vectors corresponding to the personalized topic feeds. For example, the personalized feeds are ranked based on the degree of similarity between vectors corresponding to the personalized topic feeds and the user vectors. Server recommendation application 112B is operative to rank the personalized topic feeds.

In some aspects, the ranked personalized feeds are provided to user 110 through application 108. For example, the personalized topic feeds are displayed in application 108 in ascending or descending order of their rank. In some aspects, the personalized feeds are filtered based on the determined rank before being provided to user 110. After providing the personalized topic feeds, method 300 ends at OPERATION 398.

Figure 4:
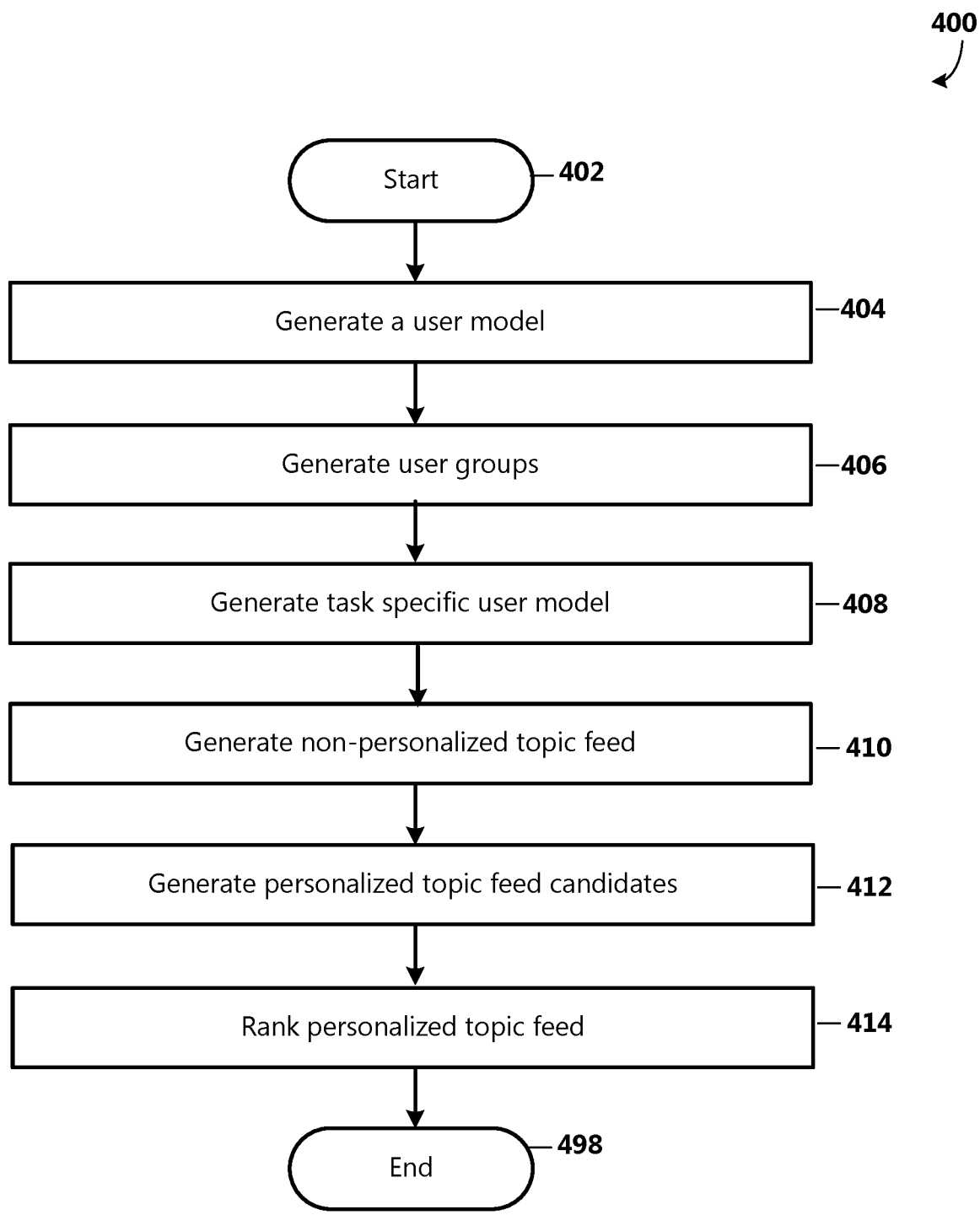
FIG. 4 is a flow chart showing general stages involved in an example method for providing a topic feed based on a specific task.

FIG. 4 is a flow chart showing an example method 400 for providing a topic feed to user 110 for specific tasks. For example, method 400 allows user 110 to create a specific task, such as an interest group, and provide a feed based on a specific task (on the interest group). After the user specific task is completed, the feed is discontinued.

With reference now to FIG. 4, method 400 begins at start OPERATION 402, and proceeds to OPERATION 404, where a user model is generated. For example, and as discussed previously, the user model is generated based on the user data. For example, the user model is generated based a task created by user 110. In one aspect, the user model is presented as one or more user vectors. In some aspects, server recommendation application 112B is operative to generate the user vectors.

After generating the user model at OPERATION 404, method 400 proceeds to OPERATION 406, where one or more user groups are generated. The user groups include a list of users who are interested in, or have created, a similar task. In some aspects the user groups are generated based on the user vectors. Server recommendation application 112B is operative to automatically extract user groups from the available user data and map user 110 to one or multiple groups.

After generating the user groups at OPERATION 406, method 400 proceeds to OPERATION 408, where a task-specific user model is generated. The task-specific user model is generated based on the task associated with the user groups. In some aspects, the task-specific user model includes one or more task specific user vectors. For example, the task associated with a user group is represented as one or more task specific user vectors. In one aspect, server recommendation application 112B is operative to generate the task-specific user models.

After generating the task specific user model at OPERATION 408, method 400 proceeds to OPERATION 410, where a non-personalized topic feed are generated. The non-personalized topic feed is generated based on the task-specific user model. In one aspect, server recommendation application 112B is operative to generate the non-personalized topic feed. For example, server recommendation application 112B is operable to conduct a search to locate data associated with the task-specific user model. Server recommendation application 112B is operable to conduct the search on data stored on server 106, one or more data storage devices associated with server 106, or the Internet.

After generating the non-personalized topic feed at OPERATION 410, method 400 proceeds to OPERATION 412, where personalized topic feed candidates are generated. The personalized topic feed candidates are generated based on the user model and the non-personalized topic feed. Server recommendation application 112B is operative to generate the personalized topic feeds. For example, server recommendation application 112B is operative to filter personalized topic feed candidates from the non-personalized topic feeds using the user vector of the user model.

After generating the personalized topic feed candidates at OPERATION 412, method 400 proceeds to OPERATION 414, where the personalized topic feeds are ranked. For example, the personalized topic feed candidates are ranked on a predetermined scale based on a degree of match between a vector representative of the personalized topic feed candidates and user vectors from the user model. In some aspects, server recommendation application 112B is operative to rank the personalized topic feeds.

After ranking the personalized topic feed candidates, a personalized feed is provided to user 110 through application 108. A content for the personalized topic feed is determined from the personalized topic feed candidates. For example, the content is determined from the personalized topic feed candidates by filtering the personalized topic feed candidates based on the determined ranking. After providing the personalized topic feed, method 400 ends at OPERATION 498.

In one aspect, the disclosed recommendation application 112 provides ability for user 110 to create one or more categories or tasks, follow one or more topics, and collect content related to one or more tasks. In addition, recommendation application 112 generates recommendations under the user-specified categories or tasks. For example, recommendation application 112 generates and provides recommendations specific to a category or to a task. In addition to providing a category-specific recommendation, recommendation application 112 is operative to provide a main recommendation feed aggregating content from all categories. Moreover, recommendation application 112 enables user 110 to reconfigure the created categories or tasks. For example user 110 can remove a category or a task. Accordingly, recommendation application 112 then discontinues recommendations related to the removed category or task.

In example aspects, and as discussed above, the user data for generating user vectors includes favorites and collections, followed topics, search history, browsing logs, social connections, online profiles, etc. However, it will be apparent to a person with skill in the art that this list is not exhaustive. This user data is collected from an agent on computing device 102 associated with user 110, such as user recommendation application 112A or application 108. As discussed previously, the user data are utilized for content modelling. For example, the user data are used for text understanding, user interest modelling, content (recommendable) intent modelling, content intent tagging, user clustering, content clustering, and ranking. In some aspects, the user data are used for determining a rank between users and different types of content.

In example aspects, feed generation includes generating a personal feed, a user group feed, and/or a general feed. The generated feed is based on implicit interests or explicit interests of user 110. In addition, the feed is generated based on relevance and visual appeal. Other criteria for the feed generation include freshness, trend, and diversity. In addition, the generated feed includes different content types. For example, the types for the generated feed includes images/videos, collections, or curator types.

In some aspects, the generated feed is presented to user 110 as an image stream, a topic stream, a collection feed, or a topic feed. In examples aspects, the generated feed provided to user 110 is updated regularly. The update is either a quick feed update or a regular feed update. The frequency of update is determined based on freshness and streaming. For example, the provided feed is updated based on a frequency of user data collection.

In addition to providing the recommendation feed and updating the provided feed, one or more notifications are also provided. For example, a notification is provided when the provided feed is updated. The notification is a voice notification, an email notification, a message notification, etc. The notification is provided as both in-product notification and out-product notification.

In one aspect, in the content modelling the user data are mapped to text and the text is mapped to a semantic space. In content modeling, a user query from the user data is split into multiple terms (also referred to as bigrams is this disclosure). For example, a user query of "Jane Doe Photoshoot" is split into bigrams "Jane Doe" and "photoshoot." One or more term vectors are generated from the bigrams. For example, term vectors for user query "Jane Doe Photoshoot" include vector{jane doe} and vector{photoshoot}. One or more query vectors are generated from the term vectors. For example, for query (jane doe photoshoot), the query vectors vector(jane doe).idf(jane doe) and vector (photoshoot).idf(photoshoot) are generated.

In example aspects, during the process of user/content modeling, different types of query vectors are generated. For example, generated query vectors include image vectors, user vectors, and collection vectors. In some aspects, the different types of generated query vectors are compared to generate a user feed. In another aspect, content similarity for user feed is determined based on the vectors cosine similarity.

In one aspect, a singular value decomposition (SVD) matrix is used in text/content modelling. For example, a sparse matrix (R) for determining a likeness measure between object i and item j is created (also referred to as $R_{i,j}$). A rank-k regularized SVD matrix decomposition method, for example, Tikhnov regularization, is applied to define $R = U \cdot I^t$, where U and I minimize a Loss. The Loss for the SVD matrix decomposition method is defined as:

$$\text{Loss} = \Sigma_{i,j}(U_i \cdot I_j - R_{i,j})^2 + \lambda(\Sigma_i n_{U_i}\|U_i\|^2 + \Sigma_j n_{I_j}\|I_j\|^2) \quad (1)$$

In equation (1), $\lambda$ is a regularization parameter, $n_{U_i}$ (resp. $n_{I_j}$) is a number of ratings of object $U_i$ (respective to $I_j$). In a first step of the text/content modelling using SVD, matrix I is initialized with K random values per row. In a second step, matrix I is fixed and the matrix U is determined that minimizes the loss of equation (1) for the given matrix I. In the third step, matrix U is fixed and the matrix I is determined that minimizes the Loss of equation (1) for the given matrix U. The second step and the third step are repeated for a predetermined (N) number of times.

In one aspect, to find the best K (dimensions), $\lambda$ (regularization), and N (number of iterations), ratings are split into a training set and a test set per object basis. A SVD matrix is built from the training set minimizing the Loss represented by equation (1). The training set and parameters are chosen that minimize a root mean square error (RMSE), also referred to as a root mean square deviation (RMSD), represented by equation (2) below on the test set:

$$RMSE = \sqrt{\frac{\Sigma_{i,j}(U_i I_j - R_{i,j})^2}{N}} \quad (2)$$

For example, images collected from user 110 are mapped to texts. One or more users are then selected based on a minimum number of images collected. For example, users with at least fifty images for which BRQs (Boolean Range Query) for words/text extracted from images are found are selected.

The mapped texts are split into bigrams. For example, BRQs are split into the bigrams using a list of bigrams. In some aspects, terms which contain entity names or for a word sequence with a high probability from a language model are not split. After generating the bigrams, a term popularity (S) is determined for each bigram. For example, for a user, a popularity of a bigram is determined as:

$$S(\text{user, term}) = \frac{\text{count}}{\text{number of collected } BRQs} \quad (3)$$

After determining the term popularity, a popularity bias is removed. For example, popularity bias is removed as:

$$S(\text{user,term}) \leftarrow S(\text{user,term}) - AVG_i(S(i,\text{term})) \quad (4)$$

After removing the popularity bias using equation (4), a predetermined number of terms per user are selected. For example, the top 500 terms on the popularity score are selected. In some aspects, for a user 110, terms where the popularity score is higher than that of an average user are selected.

After selecting the terms for user 110, a term-to-term occurrence (also referred to as a term-to-term rating) (coOcc) is determined. In some aspects, popular terms have higher coOcc ratings. In other aspects, the coOcc rating of popular terms are normalized by an average per term. For example, normalized rating for a term is determined as:

$$\text{Rating}(term1, term2) = \frac{coOcc(term1, term2)}{AVG_i(coOcc(term1, i))} \quad (5)$$

After generating the normalized ratings for the selected terms, a SVD matrix is built. For example, a SVD matrix with a field value of K=200 is built. In the example SVD matrix, a number of bigrams in matrix U is approximately one million and a number of bigrams in matrix I is approximately 1.8 million. A number of training samples could read up to two billion.

After building the SVD matrix, image vectors are generated from term vectors and non-favored image vectors. In addition, user vectors are generated from favorited images and the term vectors. A ranking score is then determined from the user vectors and the image vectors. In one aspect, the ranking score is determined based on similarity of the vectors.

In example aspects, the user/content models are evaluated on test data. For example, the user/content model should rank, during the evaluation, the user's favorited images higher than random images. For evaluation, a user evaluation set is created. For example, the user's 110 favorite images are split into a training set and a testing set. For example, approximately 70% of the user's 110 favorite images are split as the training set and approximately 30% of the user's 110 favorite images are split as the testing set. An evaluation set is created by mixing stratified sampled images with the images of the testing set.

After generating the training set and the evaluation set of images, user vectors are then generated from the images of the training set. In some aspects, the image vectors are generated for all images of the training set and the test set. A ranking for all the images is determined from the user vectors and the image vectors. In the computed ranking, the ranking of the user's 110 favorite images should be higher than the ranking of the stratified sampled images. A normalized discounted cumulative gain (NDCG) is determined for user 110. A model relevance NDCG is calculated as an average of users NDCG.

In one aspect, and as discussed previously, the image modeling includes determining text corresponding to the image and generating image vectors from the generated text. For example, for a picture of a baby elephant, the text corresponding to the image could include "baby elephant playing" and "baby elephant." A bigram for extracted text "baby elephant playing" is determined as {baby elephant} {playing}. A bigram for extracted text "baby elephant" is determined as {baby elephant}. BRQ candidate SVD vectors for the bigrams of the extracted text are determined as vector(baby elephant)*idf(baby elephant)+vector(playing) *idf(playing) and vector(baby elephant). Hence, the image vector for the image of the baby elephant is determined as 2*vector(baby elephant playing)+1*vector(baby elephant). In another example, image vectors for an image of an actor includes cosine(image, "name of actor"), cosine(image, "color and haircuts"), cosine (image, "actresses"), cosine (image, "movie name").

In some aspects, the determined image vectors are assigned weights. For example, a weight for vector cosine (image, "baby elephant") is determined as 0.942. Similarly, the weight for vectors cosine(image, "animals"), cosine (image, "adorable"), and cosine (image, "brothers") is determined as 0.817, 0.636, and 0.300 respectively. The weights for the image vectors are determined based on the model relevance NDCG. In some aspects, all image vectors are normalized before each arithmetic operation.

In some aspect, and as discussed previously, user 110 is modelled as one user vector or multiple user vectors. When user 110 is modelled as one vector, the user vector is determined taking into account all of the user activities, including, user favorites, user dislikes, user followed topics, etc. For example, text corresponding to the favorite images, followed topics and disliked images are generated. One or more terms from the generated text are determined. Term-frequencies are determined for the terms. Un-biased term frequencies are determined and irrelevant terms are removed. Irrelevant terms include terms which user 110 engages with is less than that of an average user. Terms which are disliked more than they are liked by user 110 are also removed.

Scores for each of the selected terms are determined based on the determined un-biased frequency and average for that term. During the scoring, scores of disliked terms are demoted. In some aspects, during the scoring, new terms are added. For example, one or more terms which are very relevant to top extracted terms are added. The scores are recalculated after addition of the new terms.

After determining scores for the relevant terms, term vectors are calculated. For example, a favorite topic vector is calculated. In addition, a dislike vector corresponding to terms generated from the disliked images/topics is calculated. The dislike vector is then aggregated with the favorite topic vector to determine the user vector. In some aspects, the dislike vector is aggregated with the favorite topic with a predetermined negative weight attached to it.

In contrast, in multiple user vector modeling, user 110 is modeled as one vector per matter. In one aspect, two types of vectors are generated, positive vectors from positive signals and negative vectors from negative signals in the user data. For example, positive user vectors are generated from user favorites and topics followed by user 110. Negative user vectors are generated from dislikes in the user data.

In some aspects, a self-organizing map (SOM), such as a Kohonen Network map, is used in the multiple user vector modelling. A score for a newly favorited image is determined based on proximity to a matching vector on the SOM. For example, a celebrity image score is determined based on user celebrity vector. In some aspects, if a new image is closed to a negative user vector than to a positive user vector, user 110 is most likely to dislike it.

Figure 5:
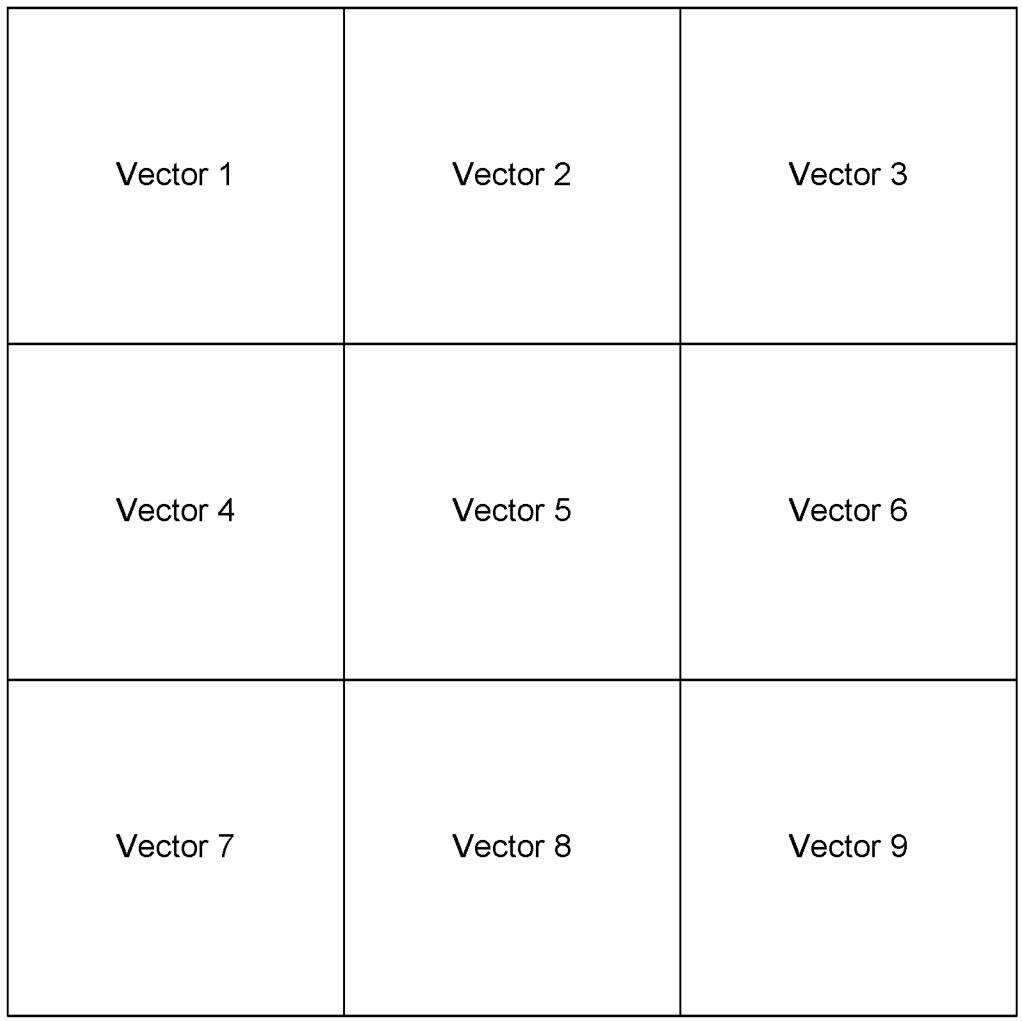
FIG. 5 is a diagram illustrating an example self-organizing map.

In some aspects, the SOM in the multiple user vector modelling includes a set of vectors which are neighbors. An example SOM 500 is illustrated in FIG. 5. In an aspect, one SOM is trained per user. The SOM for user 110 is trained based on user' 110 activities. For example, the SOM for user 110 is trained based on user 110 likes and dislikes for content.

For training, a set of vectors initialized in the SOM. In some aspects, the initial set of vectors in the SOM are random vectors. In another aspect, the initial set of vectors in the SOM are generated from user's favorite image vectors. For each favorited image afterwards, an image vector for the favorited image is generated and compared with the vectors of the SOM to find the closest vector in the SOM. The closest vector and its neighbors are then updated to be more similar to the newly favorited image vector. In some aspects, a weight of the update decreases after each iteration.

In some aspects, after the training, each vector of the SOM represents a user interest. Related interests are in neighboring vectors. When two neighbors are very similar, they are combined into one vector. A new image is scored based on a vector of the SOM that the new image vector is closest to. If there is no one vector on the SOM matching with the new image vector, the new image vector is scored based on its distance from multiple vectors it relates to on the SOM.

In some aspects, more than one SOM is created for user 110. For example, a positive SOM and a negative SOM are created for user 110. In one aspect, the SOM is a one dimensional and a non-circular map. A size of the SOM is dependent on user's 110 positive and negative signals. In some aspects, the size of the SOM is predetermined by user. In some aspects, the size of the SOM is dynamically altered. For example, one or more vectors on the SOM can be merged or removed from the map.

In some aspects, one or more bad vectors are dynamically removed from the SOM. For example, a ranking is determined for user's 110 favorite images and followed topics along with a predetermined number of stratified images. Each image is ranked by its closest vector only. Good vectors in the SOM should be able to rank higher the images they were built on than the random stratified images. A training NDCG is computed for each vector of the SOM. Vectors with the computed training NDCG less than a predetermined threshold are removed from the SOM.

In some aspects, and as discussed previously, the user recommendation feed is generated based on the user data. For example, the user data, such as, favorite images, followed topics, disliked images, etc. is collected. User vectors are generated from the collected user data. In addition, one or more SOMs are generated from the user vectors. User item data are then collected. The user item data includes images, top topics, and item clusters. Clusters include sports (boxing, football, etc.), travel and places (Hawaii beach, Paris Eiffel Tower, etc.), etc. The user items data are filtered based on the user vectors and the filtered items data are provided to user 110 as the recommendation feed.

One or more topics are selected from the user items data. For example, all topic candidates are gathered and ranked based on the user vectors. Clusters are used to control diversity in topic selection. One or more items (or images) are selected from the ranked user item data. For example, a predetermined number (such as, top 25) of images of a topic are selected. In another example, a predetermined number of top images from each cluster are selected. The selected images are filtered again with user vectors. For example, the selected images are ranked based on the user vectors and predetermined number (such as, top 10) images are presented in the user feed.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
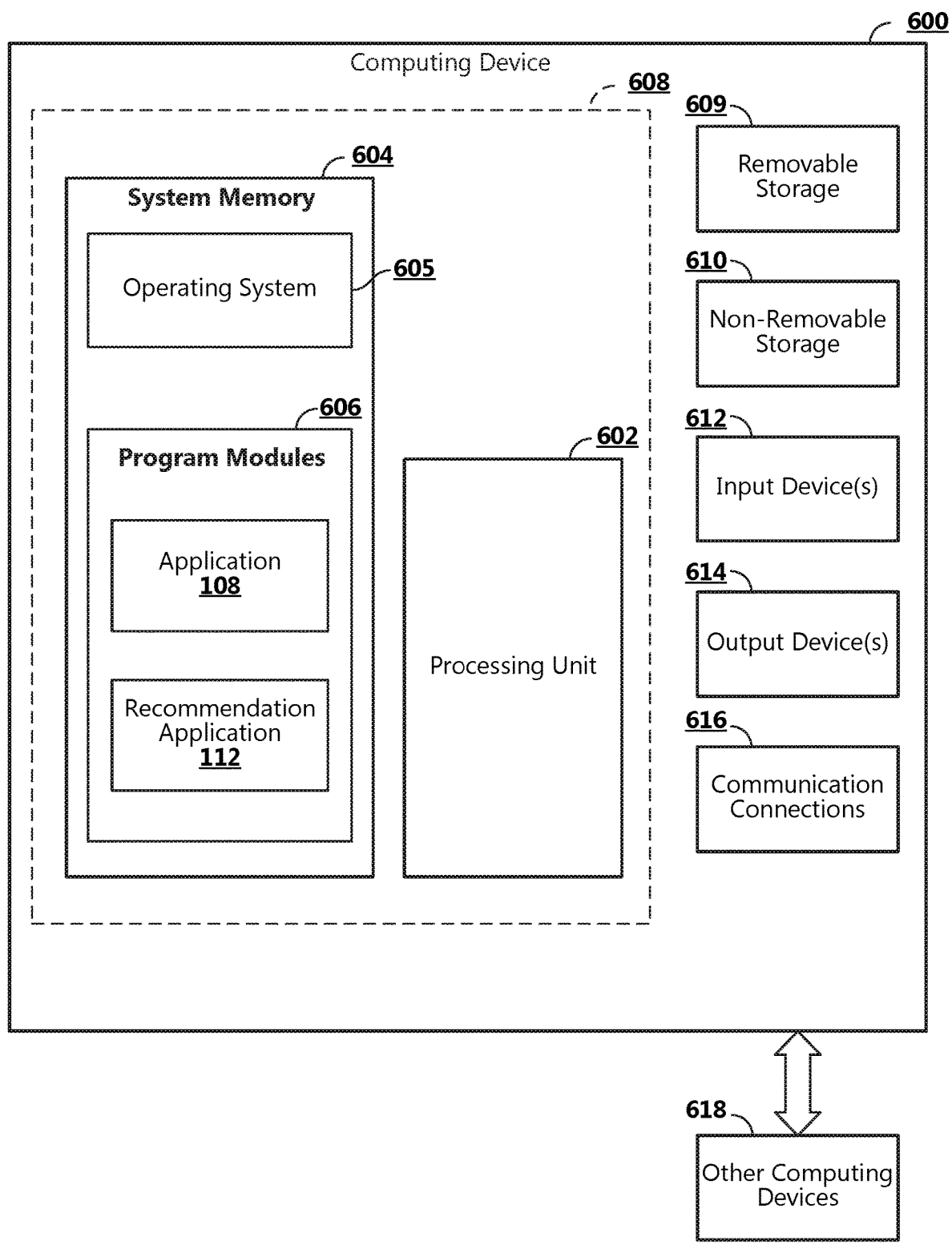
FIG. 6 is a block diagram illustrating example physical components of a computing device.
Figure 7A:
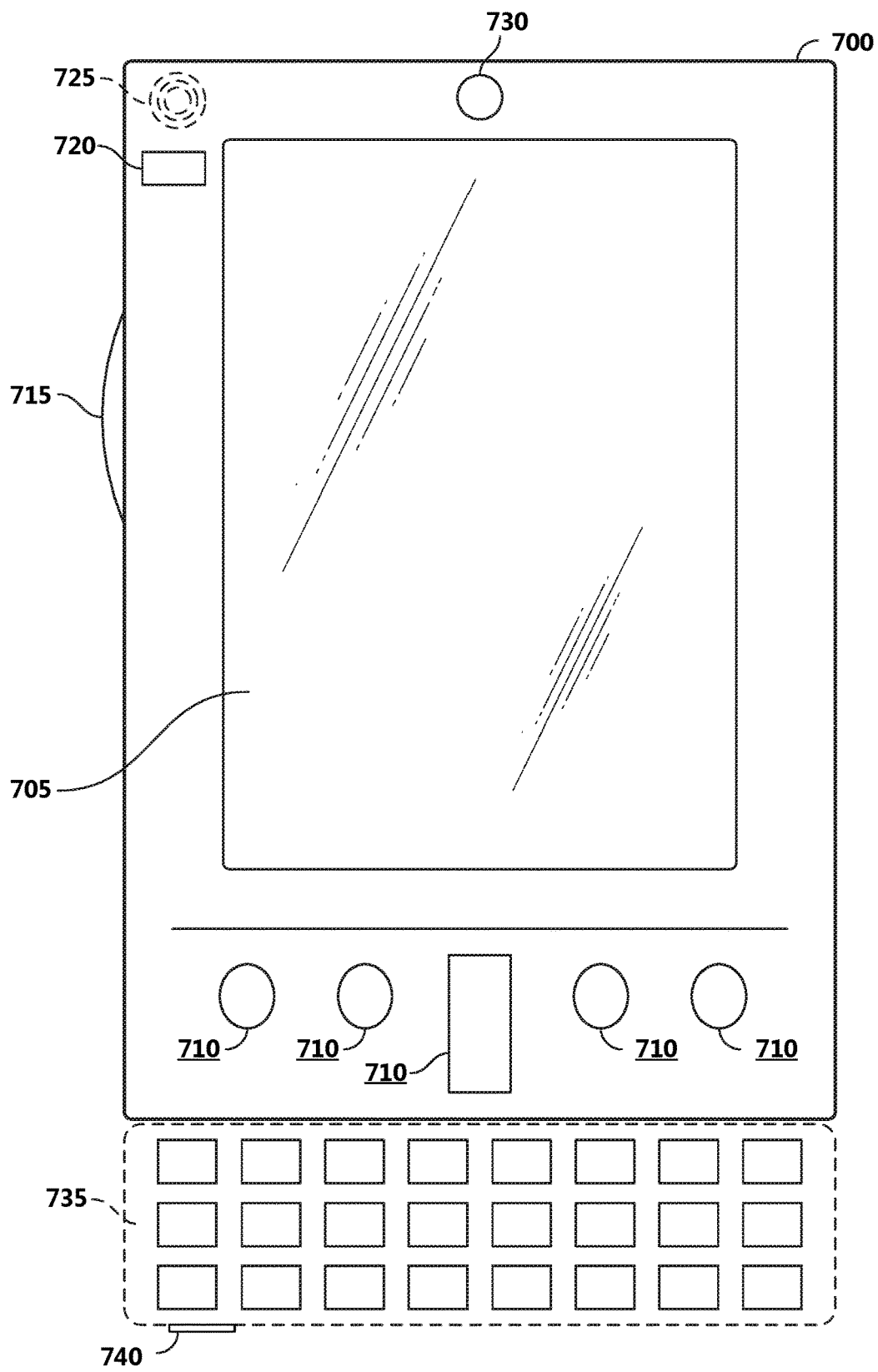
FIGS. 7A and 7B are block diagrams of a mobile computing device.
Figure 7B:
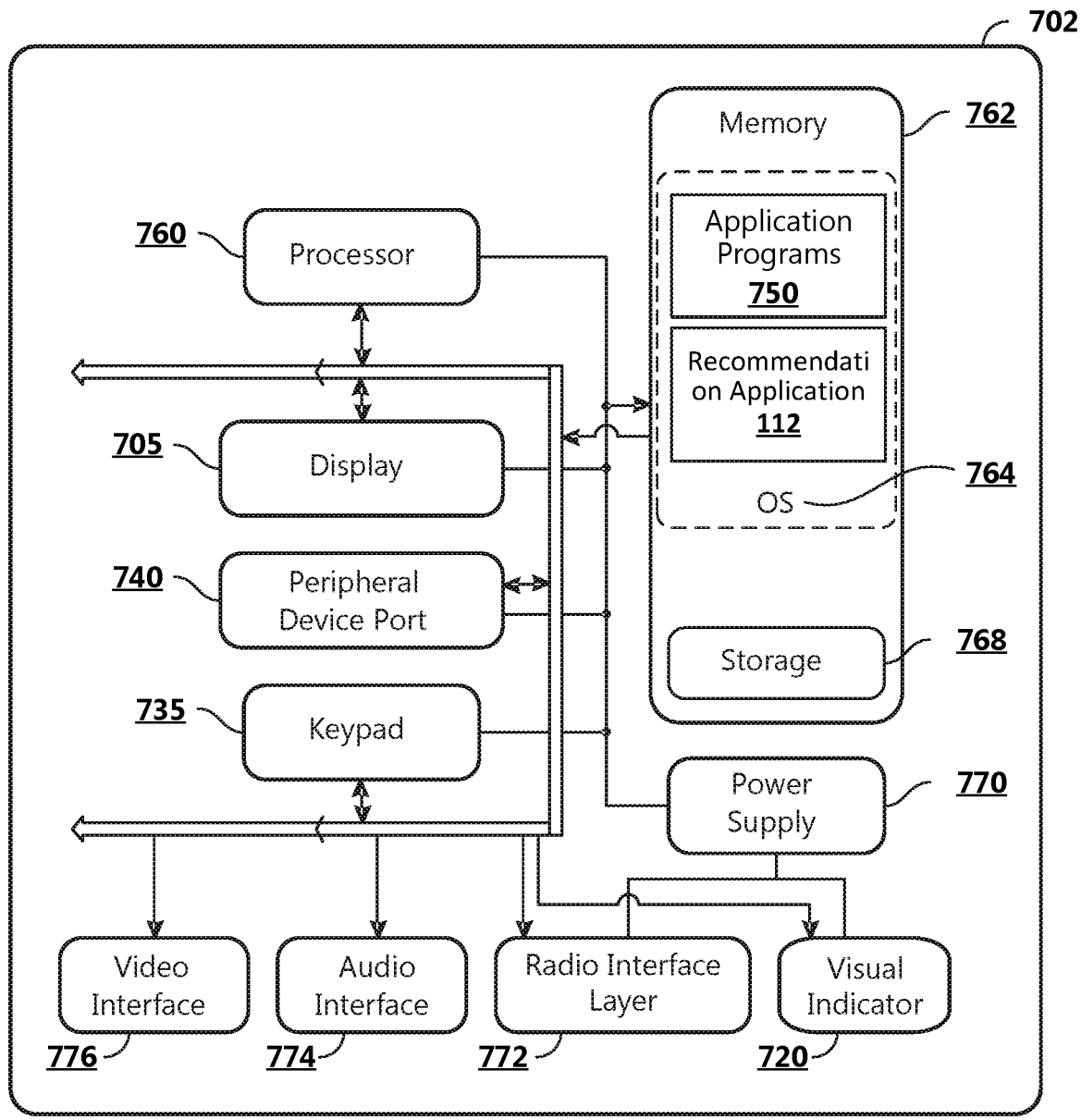
Figure 8:
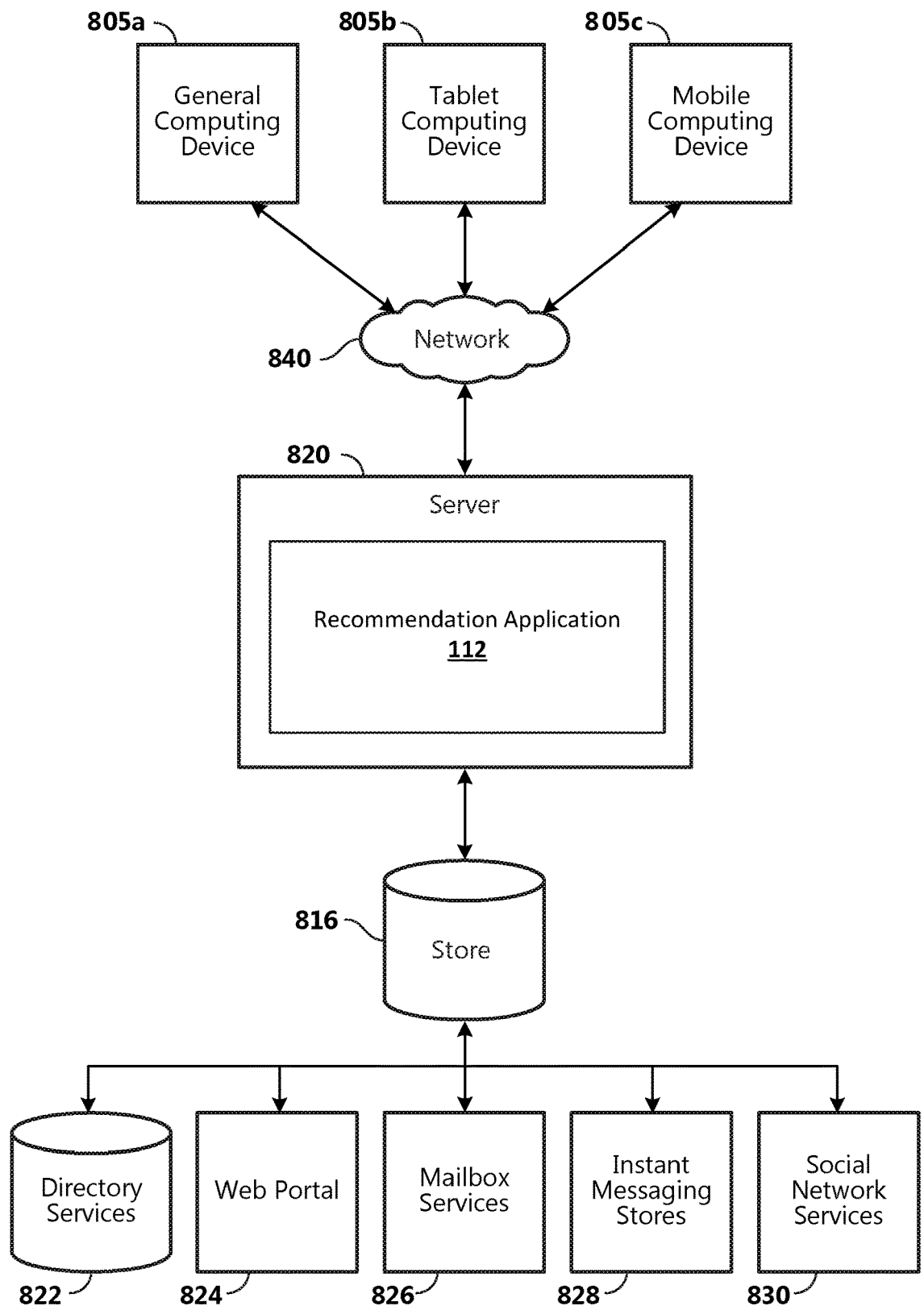
FIG. 8 is a block diagram of a distributed computing system.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, computing device 600 includes at least one processing unit 602 and a system memory 604. According to an aspect, depending on the configuration and type of computing device, system memory 604 comprises, but is not limited to, volatile storage (e.g., random access memory), non-volatile storage (e.g., read-only memory), flash memory, or any combination of such memories. According to an aspect, system memory 604 includes an operating system 605 and one or more program modules 606 suitable for running software applications. According to an aspect, system memory 604 includes a recommendation module. Operating system 605, for example, is suitable for controlling the operation of computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, computing device 600 has additional features or functionality. For example, according to an aspect, computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in system memory 604. While executing on processing unit 602, program modules 606 (e.g., recommendation application 112) perform processes including, but not limited to, one or more of the stages of methods 200, 300, and 400 illustrated in FIGS. 2, 3, and 4 respectively. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, computing device 600 has one or more input device(s) 612 such as a keyboard, a mouse, a pen, a sound input device, a touch input device, etc. Output device(s) 614 such as a display, speakers, a printer, etc. are also included according to an aspect. The aforementioned devices are examples and others may be used. According to an aspect, computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. System memory 604, removable storage device 609, and non-removable storage device 610 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by computing device 600. According to an aspect, any such computer storage media is part of computing device 600. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, mobile computing device 700 is a handheld computer having both input elements and output elements. Mobile computing device 700 typically includes a display 705 and one or more input buttons 710 that allow the user to enter information into mobile computing device 700. According to an aspect, display 705 of mobile computing device 700 functions as an input device (e.g., a touch screen display). If included, an optional side input element 715 allows further user input. According to an aspect, side input element 715 is a rotary switch, a button, or any other type of manual input element. In alternative examples, mobile computing device 700 incorporates more or less input elements. For example, display 705 may not be a touch screen in some examples. In alternative examples, mobile computing device 700 is a portable phone system, such as a cellular phone. According to an aspect, mobile computing device 700 includes an optional keypad 735. According to an aspect, optional keypad 735 is a physical keypad. According to another aspect, optional keypad 735 is a "soft" keypad generated on the touch screen display. In various aspects, the output elements include display 705 for showing a graphical user interface (GUI), a visual indicator 720 (e.g., a light emitting diode), and/or an audio transducer 725 (e.g., a speaker). In some examples, mobile computing device 700 incorporates a vibration transducer for providing the user with tactile feedback. In yet another example, mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, mobile computing device 700 incorporates a system (i.e., an architecture) 702 to implement some examples. In one example, system 702 is implemented as a "smart phone" capable of running one or more applications (e.g., browser, e-mail, calendaring, contact managers, messaging clients, games, and media clients/players). In some examples, system 702 is integrated as a computing device, such as an integrated personal digital assistant (PDA) and wireless phone.

According to an aspect, one or more application programs 750 are loaded into memory 762 and run on or in association with operating system 764. Examples of the application programs include phone dialer programs, e-mail programs, personal information management (PIM) programs, word processing programs, spreadsheet programs, Internet browser programs, messaging programs, and so forth. According to an aspect, recommendation application 112 is loaded into memory 762. System 702 also includes a non-volatile storage area 768 within memory 762. Non-volatile storage area 768 is used to store persistent information that should not be lost if system 702 is powered down. Application programs 750 may use and store information in non-volatile storage area 768, such as e-mail or other messages used by an e-mail application, and the like. A synchronization application (not shown) also resides on system 702 and is programmed to interact with a corresponding synchronization application resident on a host computer to keep the information stored in the non-volatile storage area 768 synchronized with corresponding information stored at the host computer. As should be appreciated, other applications may be loaded into memory 762 and run on mobile computing device 700.

According to an aspect, system 702 has a power supply 770, which is implemented as one or more batteries. According to an aspect, power supply 770 further includes an external power source, such as an AC adapter or a powered docking cradle that supplements or recharges the batteries.

According to an aspect, the system 702 includes a radio 772 that performs the function of transmitting and receiving radio frequency communications. Radio 772 facilitates wireless connectivity between system 702 and the "outside world," via a communications carrier or service provider. Transmissions to and from radio 772 are conducted under control of operating system 764. In other words, communications received by radio 772 may be disseminated to application programs 750 via operating system 764, and vice versa.

According to an aspect, visual indicator 720 is used to provide visual notifications and/or an audio interface 774 is used for producing audible notifications via the audio transducer 725. In the illustrated example, visual indicator 720 is a light emitting diode (LED) and audio transducer 725 is a speaker. These devices may be directly coupled to power supply 770 so that when activated, they remain on for a duration dictated by the notification mechanism even though processor 760 and other components might shut down for conserving battery power. The LED may be programmed to remain on indefinitely until the user takes action to indicate the powered-on status of the device. Audio interface 774 is used to provide audible signals to and receive audible signals from the user. For example, in addition to being coupled to audio transducer 725, audio interface 774 may also be coupled to a microphone to receive audible input, such as to facilitate a telephone conversation. According to an aspect, system 702 further includes a video interface 776 that enables an operation of an on-board camera 730 to record still images, video stream, and the like.

According to an aspect, a mobile computing device 700 implementing the system 702 has additional features or functionality. For example, mobile computing device 700 includes additional data storage devices (removable and/or non-removable) such as, magnetic disks, optical disks, or tape. Such additional storage is illustrated in FIG. 7B by non-volatile storage area 768.

According to an aspect, data/information generated or captured by mobile computing device 700 and stored via system 702 is stored locally on mobile computing device 700, as described above. According to another aspect, the data is stored on any number of storage media that is accessible by the device via radio 772 or via a wired connection between mobile computing device 700 and a separate computing device associated with mobile computing device 700, for example, a server computer in a distributed computing network, such as the Internet. As should be appreciated such data/information is accessible via mobile computing device 700 via radio 772 or via a distributed computing network. Similarly, according to an aspect, such data/information is readily transferred between computing devices for storage and use according to well-known data/information transfer and storage means, including electronic mail and collaborative data/information sharing systems.

FIG. 8 illustrates one example of the architecture of a system for providing targeted recommendations as described above. Content developed, interacted with, or edited in association with recommendation application 112 is enabled to be stored in different communication channels or other storage types. For example, various documents may be stored using a directory service 822, a web portal 824, a mailbox service 826, an instant messaging store 828, or a social networking site 830. Recommendation application 112 is operative to use any of these types of systems or the like for providing targeted recommendations, as described herein. According to an aspect, a server 820 provides targeted recommendations to clients 805a,b,c. As one example, server 820 is a web server providing the targeted recommendations over the web. Server 820 provides the targeted recommendations over the web to clients 805 through a network 840. By way of example, the client computing device is implemented and embodied in a personal computer 805a, a tablet computing device 805b or a mobile computing device 805c (e.g., a smart phone), or other computing device. Any of these examples of the client computing device are operable to obtain content from store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing targeted recommendations, comprising:
   receiving profile data input from a plurality of user interfaces, the received profile data indicating a plurality of users' interests and being representative of topics of interest of the plurality of users;
   generating groups of users based on at least one common interest topic within the received user profile data among the plurality of users;
   generating a topic specific profile of a user based on that user's profile data and at least one of the common interest topics of the user;
   generating non-personalized topic feeds based on a search locating content associated with one or more of the common interest topics;
   generating personalized topic feed candidates filtered from the generated non-personalized topic feeds based on the user's generated topic specific profile;
   ranking the generated personalized topic feed candidates based on a closeness of the generated personalized topic feed candidates to the user's topics of interest and
   displaying one or more of the generated personalized topic feed candidates to the user in an ascending ranked order.

2. The method of claim 1, wherein generating the user topic specific profile comprises generating one or more user vectors from the user profile data.

3. The method of claim 2, wherein the one or more user vectors comprises:
   mapping the user profile data to text;
   generating one or more bigrams from the text; and
   generating the one or more user vectors from the bigrams.

4. The method of claim 2, wherein generating the user topic specific profile comprises generating a self-organizing map comprising the one or more user vectors.

5. The method of claim 4, further comprising dynamically updating the self-organizing map.

6. The method of claim 5, wherein updating the self-organizing map comprises including at least one new user vector into the self-organizing map, the at least one new user vector corresponding to a new interest associated with the user.

7. The method of claim 1, further comprising ranking the personalized topic feed candidates on a predetermined scale.

8. The method of claim 1, wherein the user profile data comprises a user category created by a user.

9. The method of claim 8, further comprising discontinuing displaying the one or more of the generated personalized topic feed candidates upon deletion of the user category.

10. A system for providing targeted recommendations, the system comprising:
    at least one processing device; and
    at least one computer readable data storage medium storing instructions that, when executed by the at least one processing device, cause the at least one processing device to:
    receive profile data input from a plurality of user interfaces, the received profile data indicating a plurality of users' interests and being representative of topics of interest of the plurality of users;
    generate groups of users based on at least one common interest topic within the received user profile data among the plurality of users;
    generate a topic specific profile of a user based on that user's profile data and at least one of the common interest topics of the user;
    generate non-personalized topic feeds based on a search locating content associated with one or more of the common interest topics;
    generate personalized topic feed candidates filtered from the generated non-personalized topic feeds based on the user's generated topic specific profile;
    rank the generated personalized topic feed candidates based on a closeness of the generated personalized topic feed candidates to the user's topics of interest; and
    displaying one or more of the generated personalized topic feed candidates to the user in an ascending ranked order.

11. The system of claim 10, wherein instructions that, when the instructions executed by the at least one processing device, cause the at least one processing device to:
- rank the generated personalized topic feed candidates on a predetermined scale; and
- determine the one or more generated personalized topic feed candidates to be displayed based on the rank.

12. The system of claim 10, wherein the instructions when executed by the at least one processing device cause the at least one processing device to:
- generate a task specific profile of the user;
- generate a non-personalized topic feed based on the task specific profile; and
- generate the personalized topic feed candidates from the non-personalized topic feed based on the user task specific profile.

13. The system of claim 12, wherein the instructions when executed by the at least one processing device cause the at least one processing device to:
- map a user task from the user profile data to the task specific profile.

14. The system of claim 10, wherein the instructions when executed by the at least one processing device cause the at least one processing device to:
- map the user data to text;
- generate one or more bigrams for the text; and
- generate the user topic specific profile from the bigrams, the user topic specific profile comprising one or more vectors generated from the one or more bigrams.

15. Computer readable storage media including computer readable instructions, which when executed by a processing unit is operative to:
- receive profile data input from a plurality of user interfaces, the received profile data indicating a plurality of users' interests and being representative of topics of interest of the plurality of users;
- generate groups of users based on at least one common interest topic within the received user profile data among the plurality of users;
- generate a topic specific profile of a user based on that user's profile data and at least one of the common interest topics of the user;
- generate non-personalized topic feeds based on a search locating content associated with one or more of the common interest topics;
- generate personalized topic feed candidates filtered from the generated non-personalized topic feeds based on the user's generated topic specific profile;
- rank the generated personalized topic feed candidates based on a closeness of the generated personalized topic feed candidates to the user's topics of interest; and
- displaying one or more of the generated personalized topic feed candidates to the user in an ascending ranked order.

16. The computer readable storage media of claim 15, wherein the computer readable instructions when executed by the processing unit is further operative to:
- generate a user group comprising a plurality of users associated with a topic;
- generate a topic specific profile;
- generate a non-personalized topic feed; and
- generate the personalized topic feed candidates for the user from the non-personalized topic feeds.

17. The computer readable storage media of claim 16, wherein the computer readable instructions when executed by the processing unit is further operative to:
- map the user into the user group.

18. The computer readable storage media of claim 16, wherein the computer readable instructions when executed by the processing unit is further operative to:
- discontinue displaying the one or more of the generated personalized topic feed candidates upon deletion of a user category from the user profile data.

19. The computer readable storage media of claim 15, wherein the computer readable instructions when executed by the processing unit is further operative to:
- create a self-organizing map comprising the user's topic specific profile.

20. The computer readable storage media of claim 19, wherein the computer readable instructions when executed by the processing unit is further operative to:
- dynamically update the self-organizing map based on a feedback from the user for the provided at least one targeted recommendation.

* * * * *